(12) United States Patent
Li (10) Patent No.: US 10,693,514 B1
(45) Date of Patent: Jun. 23, 2020

(54) WIRELESS AUDIO TRANSMISSION SYSTEM

(71) Applicant: SHENZHEN FZONE TECHNOLOGY CO., LTD., Shenzhen, Guangdong (CN)

(72) Inventor: Wei Li, Guangdong (CN)

(73) Assignee: SHENZHEN FZONE TECHNOLOGY CO., LTD., Shenzhen, Guangdong (CN)

( * ) Notice: Subject to any disclaimer, the term of this patent is extended or adjusted under 35 U.S.C. 154(b) by 213 days.

(21) Appl. No.: 16/071,552

(22) PCT Filed: Dec. 26, 2017

(86) PCT No.: PCT/CN2017/118648
§ 371 (c)(1),
(2) Date: Jul. 20, 2018

(87) PCT Pub. No.: WO2019/127020
PCT Pub. Date: Jul. 4, 2019

(51) Int. Cl.
*H04M 1/00* (2006.01)
*H04B 1/3827* (2015.01)
*H01R 24/66* (2011.01)
*H04B 1/3883* (2015.01)

(52) U.S. Cl.
CPC .......... *H04B 1/3833* (2013.01); *H01R 24/66* (2013.01); *H04B 1/3883* (2013.01)

(58) Field of Classification Search
CPC ..... H04B 1/3833; H04B 1/3883; H01R 24/66
USPC .............................................. 455/3.06, 575.1
See application file for complete search history.

(56) References Cited

U.S. PATENT DOCUMENTS

| | | | | |
|---|---|---|---|---|
| 8,036,609 | B2* | 10/2011 | Everett | H04B 1/02 455/103 |
| 2007/0060044 | A1* | 3/2007 | Lamb | H04B 1/202 455/3.06 |
| 2008/0227384 | A1* | 9/2008 | Placzek | H04N 21/4113 455/3.06 |
| 2017/0040833 | A1* | 2/2017 | Castillo | H04R 1/105 |
| 2017/0324923 | A1* | 11/2017 | Sohnholz | H04N 5/225 |

* cited by examiner

*Primary Examiner* — Sonny Trinh
(74) *Attorney, Agent, or Firm* — Rankin, Hill & Clark LLP (57) ABSTRACT

A wireless audio transmission system includes a wireless audio transmitter matched with an audio input device in a plug-in manner, a wireless audio receiver matched with an audio output device in the plug-in manner, the audio output device is provided with a first plug-in hole, the audio input device is provided with a second plug-in hole, the wireless audio receiver includes a signal receiving component and a first plug-in connector-signally connected with the signal receiving component and configured for matching with the first plug-in hole in the plug-in manner, and a first housing connected with the first plug-in connector; the first housing is encircled to form a first accommodation cavity which has an opening and is configured for accommodating the signal receiving component, the first plug-in connector is connected with the opening of the first housing. The present application facilitates a wide application of the wireless audio transmission system.

16 Claims, 5 Drawing Sheets

WIRELESS AUDIO TRANSMISSION SYSTEM

FIELD OF THE PRESENT APPLICATION

The present application pertains to the field of communication technology devices, and particularly to a wireless audio transmission system.

DESCRIPTION OF THE RELATED ART

At present, the developed 2.4 Ghz digital wireless audio transmission system comprises a wireless audio transmitter and a wireless audio receiver, however, the existing 2.4 Ghz digital wireless audio receivers are generally larger in size, and a connecting line is required to connect the wireless audio receiver with an audio output device, such as a sound console. Moreover, these devices need to be placed in particular places, so that they are very inconvenient in uses.

Digital life is increasingly popular these days, and the existing wireless audio transmission system is obviously difficult to meet the current development requirements.

The existing wireless audio receiver of a wireless audio transmission system cannot be directly plugged into audio output device, and a connecting line is additionally needed.

SUMMARY OF THE PRESENT APPLICATION

The present application is achieved as follows, a wireless audio transmission system, comprising a wireless audio transmitter matched with an audio input device in a plug-in manner and configured to transmit an audio signal, a wireless audio receiver matched with an audio output device in a plug-in manner and configured to receive the audio signal, wherein the audio output device is provided with a first plug-in hole matched with the wireless audio receiver in a plug-in manner, and the audio input device is provided with a second plug-in hole matched with the wireless audio transmitter in a plug-in manner, wherein the wireless audio receiver includes a signal receiving component configured to receive the audio signal and a first plug-in connector signally connected with the signal receiving component and configured to match with the first plug-in hole in plug-in manner so as to transmit the audio signal received by the signal receiving component to the audio input device, and a first housing connected with the first plug-in connector; wherein the first housing is encircled to form a first accommodation cavity which has an opening and is configured to accommodate the signal receiving component, wherein the first plug-in connector is connected with the opening of the first housing.

Further, the first plug-in connector further comprises a positioning bump arranged at an end side of the first plug-in connector facing the first housing and configured to position the first plug-in connector to be connected to the first housing, wherein the first housing is provided with a positioning slot matched with the positioning bump in uses.

Further, the first plug-in connector extends inwardly towards the first accommodation cavity and forms a plurality of connecting arms, wherein an end of the connecting arm is connected with the plug-in connector, and another end of the connecting arm is connected with the housing, wherein the plurality of the connecting arms are uniformly arranged at two sides of the positioning bump.

Further, wherein each of the connecting arms is provided with a first connecting hole, and a second connecting hole is formed in the first housing and is arranged in a position corresponding to the first connecting hole.

Further, wherein the signal receiving component comprises an antenna configured to receive the audio signal, and the wireless audio receiver further comprises an antenna cover which is connected with the housing and wraps around the periphery of the antenna.

Further, the end side of the antenna cover connected with the first housing is provided with a plurality of barbs, and the first housing is provided with a plurality of barb slots matched with the barbs, each of the barbs is snap-fitted into a corresponding barb slot.

Further, the first accommodation cavity is provided therein with a first rechargeable power supply configured to supply power to the signal receiving component, wherein the first housing is further provided with a first charging interface configured for being used by an external power supply to charge the first rechargeable power supply.

Further, the wireless audio receiver further comprises a first power button and a first frequency modulation button, both the first power button and the first frequency modulation button are arranged at the first housing; wherein the first power button is configured to switch on/off the electric connection between the first rechargeable power supply and the signal receiving component; and the first frequency modulation button is configured to switch among communication channels of the signal receiving component.

Further, the wireless audio transmitter includes a signal transmitting component configured to transmit the audio signal outwards and a second plug-in connector matched with the second plug-in hole in a plug-in manner so as to transmit the audio signal of the audio input device to the signal transmitting component, wherein a groove is formed in a side wall of the second plug-in connector, and the orientation of the groove is perpendicular to the orientation of the second plug-in hole; the wireless audio transmitter further comprises an elastic member received in the groove, wherein the elastic member elastically abuts against the bottom of the groove and the hole wall of the second plug-in hole.

Further, the arrangement path of the groove is along the peripheral side of the second plug-in connector, wherein the arrangement path of the groove is in a form of a closed-loop arrangement or an open-loop arrangement, and the loop central axis of the groove is parallel to the orientation of the second plug-in hole, the elastic member is an elastic piece in an open-loop arrangement, and the loop diameter of the groove is matched with the loop diameter of the elastic member.

Further, the cross-sectional shape of the elastic member comprises at least a V-shaped opening arranged to extend inwardly towards the loop, wherein the angle value of the central angle corresponding to the elastic member is larger than 270 degrees and smaller than 350 degrees.

Further, the elastic member is provided with a plurality of elongated holes arranged in the radial direction and arranged in a penetrating manner, wherein the length direction of each of the elongated holes is the orientation of the second plug-in hole, and each of the elongated holes is arranged at intervals along a peripheral direction of the elastic member.

Further, the elongated holes are arranged at equal intervals.

Further, the wireless audio transmitter further comprises a second housing connected with the second plug-in connector, and the second housing is encircled to form a second accommodation cavity which has an opening and is configured to receive the signal transmitting component, wherein the second plug-in connector is connected with the opening of the second housing.

Further, the second accommodation cavity is provided with a second rechargeable power supply configured to supply power to the signal transmitting component, and the second housing is further provided with a second charging interface configured to be used by an external power supply to charge the second rechargeable power supply.

Further, the wireless audio transmitter further comprises a second power button, a second frequency modulation button and a switch button, all of which are arranged at the second housing, wherein the second power button is configured to switch on/off the electric connection between the second rechargeable power supply and the signal transmitting component, and the second frequency modulation button is configured to switch among the communication channels of the signal transmitting component, and the switch button is configured to switch the connection between the wireless audio transmitter and different external audio device.

According to the present application, the audio output device is provided with a first plug-in hole, and the first plug-in connector of the wireless audio receiver is matched with the first plug-in hole of the audio output device in an plug-in manner, so that the wireless audio receiver is directly connected with the audio output device without using a connecting line. As such, the wireless audio transmitter transmits the audio signal transmitted from the audio input device. After the audio signal is received by the wireless audio receiver, the audio signal is directly transmitted to the audio output device without an additional connecting line in the middle. Said plug-in manner is simple and effective, occupy space is saved and it is convenient for application of the wireless audio transmission system.

DETAILED DESCRIPTION OF THE PREFERRED EMBODIMENTS

Embodiments of the present application will be described in detail hereinafter, examples of the embodiments are illustrated in the drawings, wherein same or similar reference numerals refer to the same or similar elements or refer to elements with the same or similar functions. The embodiments described below with reference to the drawings are exemplary, which are intended to illuminate the present application and should not be interpreted as limitations to the present application.

In the description of the present application, it should be understood that, orientation or position relationship indicated by the term such as "thickness", "upper", "lower", "vertical", "parallel", "bottom", "angle" and the like, is based on the orientation or the position relationship shown in the drawings, which is only intended to describe the present application and simplify the description, but not to indicate or imply that the indicated device or element must possess a specific orientation, or must be constructed and operated in a specific orientation. Therefore, said items shouldn't be interpreted as limitations to the present application In the present application, unless there are explicit statements and limitations, the terms "installed", "connected" should be interpreted comprehensively. For example, the connection can be fixedly connected, detachably connected, integrally connected, or it can be mechanically connected, electrically connected, directly connected or indirectly connected through an intermediate medium, or it can be an inner connection between two elements or an interaction relationship between the two elements.

Figure 1:
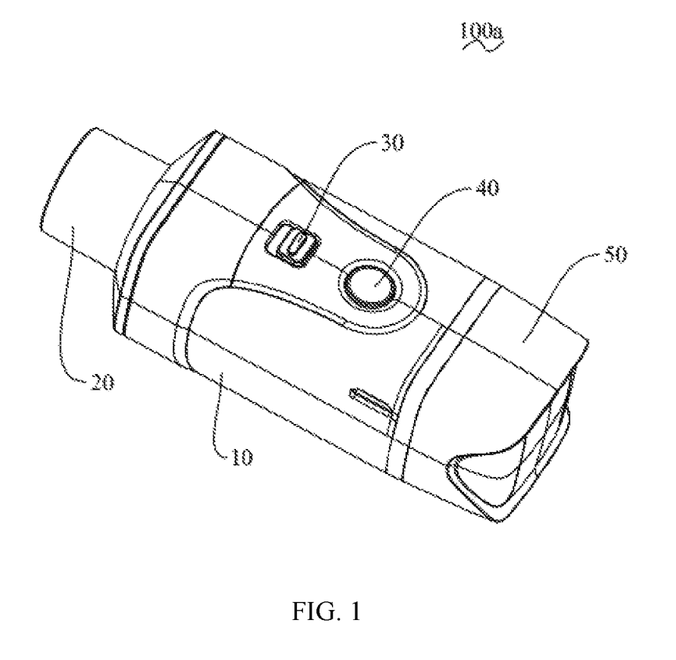
FIG. 1 is a structural schematic view of a wireless audio receiver according to an embodiment of the present application.
Figure 2:
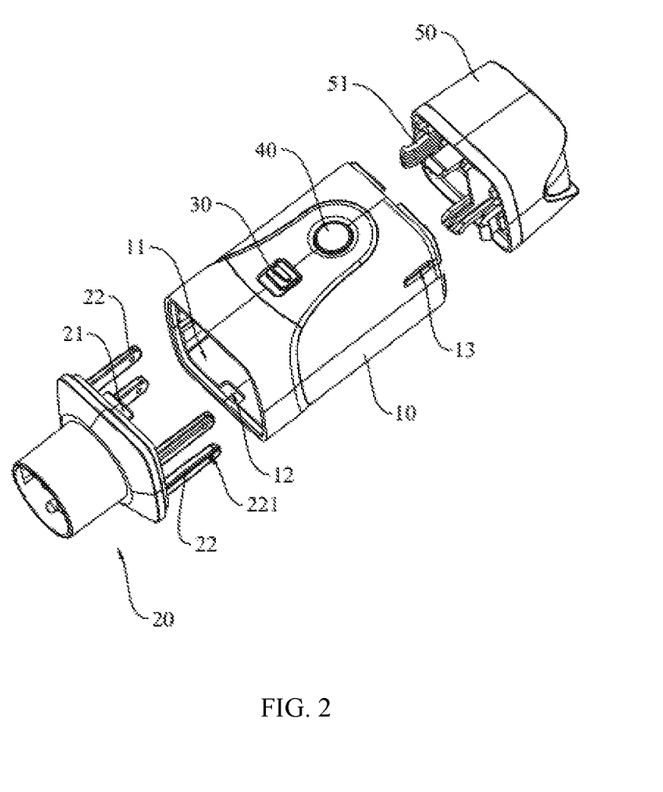
FIG. 2 is an exploded view of FIG. 1.
Figure 3:
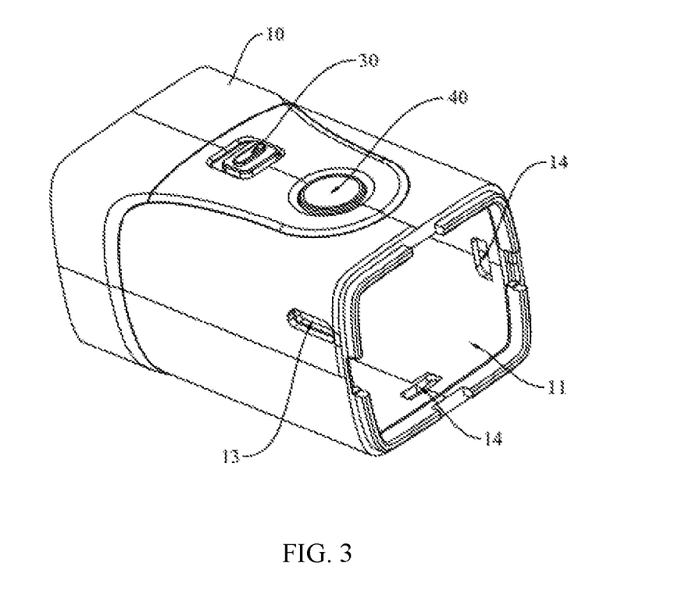
FIG. 3 is a structural schematic view of the first housing shown in FIG. 1.

Please referring to FIGS. 1-3, the wireless audio transmission system provided by the embodiment of the present application comprises a wireless audio receiver 100*a* matched with an audio output device in a plug-in manner and a wireless audio transmitter 100*b* matched with an audio input device in a plug-in manner In the present embodiment, the audio output device can be the device capable of transmitting an audio signal to the outside, such as a sound console and the like, and the audio input device can be the device capable of receiving an audio signal from the outside, such as a wireless microphone and the like.

The wireless audio transmitter 100*b* is matched with a wireless microphone (not shown in the figures) in a plug-in manner and is configured for transmitting an audio signal. The wireless audio receiver 100*a* is plugged with a sound console (not shown in the figures) and is configured for receiving the audio signal. The wireless audio transmission system adopts the 2.4 G digital wireless transmission technology, and the wireless audio receiver 100*a* is directly connected with the sound console in a plug-in manner, thereby implementing the wireless transmission of the audio signals, such that the traditional analog sound console can be converted into a digital signal receiving sound console capable of receiving a digital audio signal.

The sound console is provided with a first plug-in hole (not shown in the figures) matched with the wireless audio receiver 100*a* in a plug-in manner, and the wireless microphone is provided with a second plug-in hole (not shown in the figures) matched with the wireless audio transmitter 100*b* in a plug-in manner. The wireless audio receiver 100*a* includes a signal receiving component (not shown in the figures) configured for receiving the audio signal, and a first plug-in connector 20 signal connected with the signal receiving component and configured for plugging and matching with the first plug-in hole so as to transmit the audio signal received by the signal receiving component to the sound console, and a first housing 10 connected with the first plug-in connector 20. In the present embodiment, the first plug-in connector 20 of the wireless audio receiver 100*a* is a CANNON male pin.

The sound console is provided with a first plug-in hole, the first plug-in connector 20 of the wireless audio receiver 100*a* is matched with the first plug-in hole of the sound console in a plug-in manner, thereby achieving a direct connection between the wireless audio receiver 100*a* and the sound console without using a connecting wire,. In this way, the wireless audio transmitter 100*b* transmits an audio signal transmitted from the wireless microphone. After the audio signal is received by the wireless audio receiver 100*a*, the audio signal is directly forwarded to the sound console, and extra connecting lines do not need to be used in the middle.

The aforesaid plug-in manner is simple and effective, space occupation is saved and wide application of the wireless audio transmission system is facilitated.

The first housing 10 is encircled to form a first accommodation cavity 11 which has an opening and is configured for receiving the signal receiving component, and the first plug-in connector 20 is connected with the opening of the first housing 10.

Figure 4:
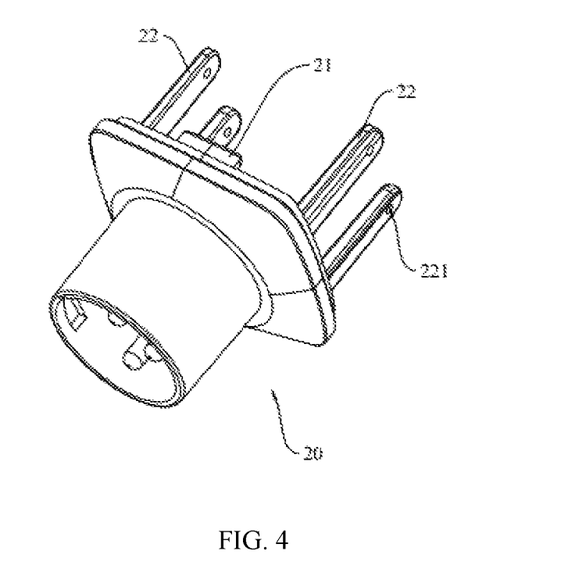
FIG. 4 is a structural schematic view of the first plug-in connector shown in FIG. 1.

The first plug-in connector 20 further includes a positioning bump 21 which is arranged at an end surface of the first plug-in connector 20 facing the first housing 10 and is configured for positioning the first plug-in connector 20 to be connected to the first housing 10. The first housing 10 is provided with a positioning slot 12 matched with the positioning bump 21 in uses. The cooperation between the positioning slot 12 and the positioning bump 21 ensures that the first plug-in connector 20 can be accurately guided to be connected with the opening of the first housing 10 in the assembling process. The number of the positioning bumps 21 is two, the two positioning bumps 21 are oppositely arranged at two opposite sides of the first plug-in connector 20.

The first plug-in connector 20 extends inwardly towards the first accommodation cavity 11 and forms a plurality of connecting arms 22. One end of the connecting arm 22 is connected with the first plug-in connector 20, and the other end of the connecting arm 22 is connected with the first housing 10, and the plurality of connecting arms 22 are uniformly arranged on two sides of the positioning bump 21.

Specifically, the number of the connecting arms 22 is four, and the four connecting arms 22 are arranged at the two sides of the two positioning bumps 21 in pairs. Each of the connecting arms 22 is provided with a first connecting hole 221, the first housing 10 is provided with a second connecting hole (not shown) positioned corresponding to the first connecting hole 221. Screws are arranged in the first connecting hole 221 and the second connecting hole respectively, so that the first plug-in connector 20 and the first housing 10 are screwed into a whole.

Figure 5:
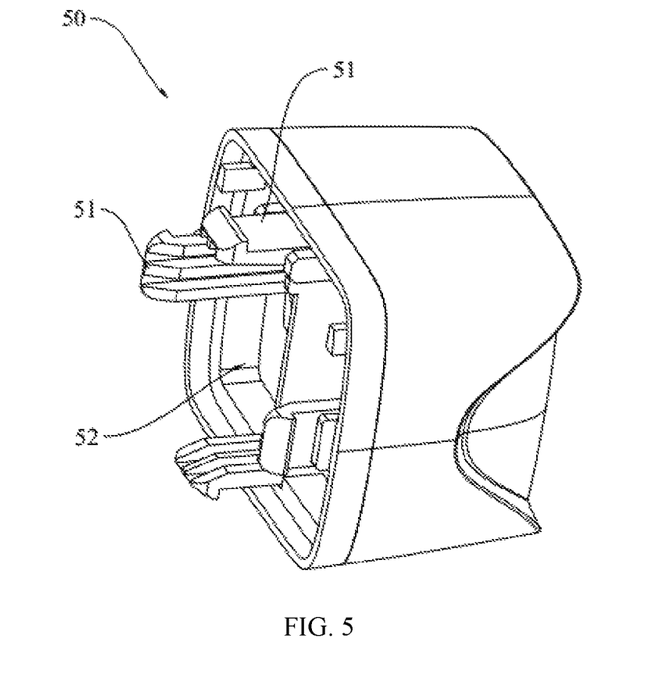
FIG. 5 is a structural schematic view of the antenna cover shown in FIG. 1.

Please refer to FIG. 4 and FIG. 5 at the same time, wherein the signal receiving component includes an antenna (not shown in the figures) configured for receiving an audio signal. The wireless audio receiver 100a further includes an antenna cover 50 which is connected to the first housing 10 and wraps around the periphery of the antenna. The end surface of the antenna cover 50 connected with the first housing 10 is provided with a plurality of barbs 51, and the first housing 10 is provided with a plurality of barb slots 14 matched with the barbs 51, and each of the barbs 51 is snap-fitted into the corresponding barb slot 14.

The antenna cover 50 is provided with an antenna cavity 52, one end of the antenna is connected with the signal receiving component, and the other end of the antenna is arranged in the antenna cavity 52. An end surface of the first housing 10 connected to the antenna cover 50 is provided with four barbs 51. The position connected with the barbs 51 on the first housing 10 is provided with four barb slots 14 matched with the barbs 51, and each of the barbs 51 is snap-fitted into the corresponding barb slot 14.

The wireless audio receiver 100a further includes a first rechargeable power supply (not shown) arranged in the first accommodation cavity 11 and configured for supplying power to the signal receiving component. The first rechargeable power supply is preferably a lithium battery, and the capacity of the lithium battery is set according to actual requirements. The first housing 10 is further provided with a first charging interface 13 used by an external power supply to charge the first rechargeable power supply. The first charging interface 13 is preferably a TYPE-C interface. In other embodiments, a wireless charging device may also be arranged within the accommodation cavity 11 so as to charge the first rechargeable power supply wirelessly.

The wireless audio receiver 100a also includes a first power button 30 and a first frequency modulation button 40, and both the first power button 30 and a first frequency modulation button 40 are arranged at the first housing 10. The first power button 30 is configured for switching on/off the electric connection between the first rechargeable power supply and the signal receiving component. The first frequency modulation button 40 is configured for switching among communication channels of the signal receiving component. Through the first power button 30, the wireless audio receiver 100a can be controlled to be power on or off. The frequency modulation button 40 may be configured to switch between communication channels of the signal receiving component, each time the frequency modulation button 40 is pressed, one channel of the signal receiving component can be switched. When the wireless audio receiver 100a is power off, the last communication channel being used is stored. When the first power button 30 turns on the wireless audio receiver 100a once again, the default communication channel is the communication channel stored when the wireless audio receiver 100a is power off. The signal receiving component has six communication channels.

Figure 6:
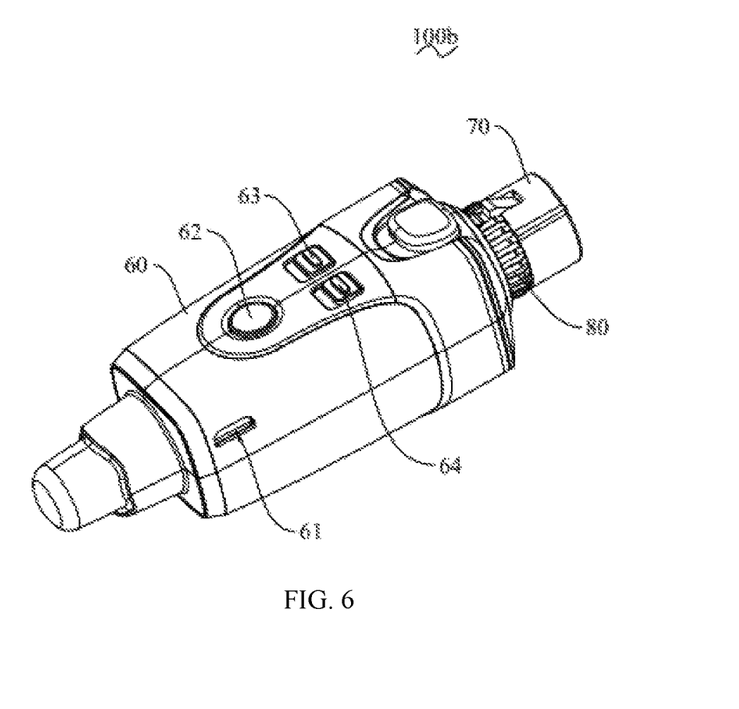
FIG. 6 is a structural schematic view of the wireless audio transmitter according to an embodiment of the present application.
Figure 7:
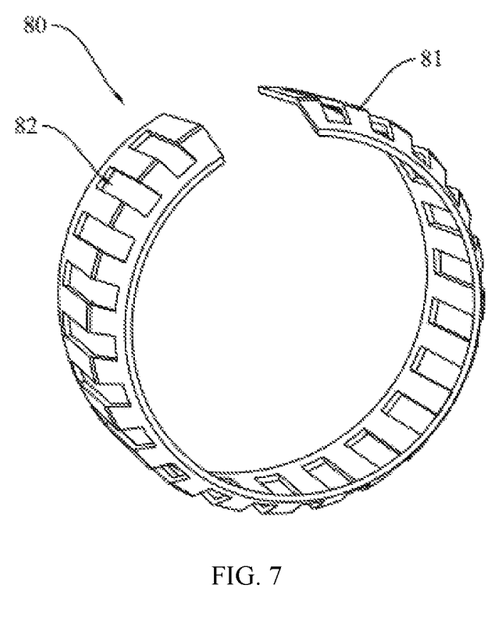
FIG. 7 is a structural schematic view of the elastic member shown in FIG. 6.

Please refer to FIG. 6 to FIG. 7 at the same time, wherein the wireless audio transmitter 100b includes a signal transmitting component configured for transmitting the audio signal outwards and a second plug-in connector 70 matched with the second plug-in hole, so as to transmit the audio signal of the wireless microphone to the signal transmitting component. The second plug-in connector 70 is provided with a groove (not shown) on the side wall of the second plug-in connector 70, and the orientation of the groove is perpendicular to the orientation of the second plug-in hole. The wireless audio transmitter 100b includes an elastic member 80 arranged in the groove, and the elastic member 80 elastically abuts against the groove bottom of the groove and the hole wall of the second plug-in hole. In the present embodiment, the second plug-in connector 70 of the wireless audio transmitter 100b is a CANNON female socket.

The wireless audio transmitter 100b is connected with the wireless microphone through a plug-in connection of the second plug-in connector 70 and the second plug-in hole. The groove is formed on the side wall of the second plug-in connector 70, and an elastic member 80 is arranged in the groove. The elastic member 80 elastically abuts against the groove bottom of the groove and the hole wall of the second plug-in hole. In this way, according to the elastic abutment of the elastic element 80, the interacting force between the second plug-in connector 70 and the second plug-in hole is increased, so that the plug-in cooperation between the wireless audio transmitter 100b and the wireless microphone can be reinforced. This plug-in manner is simple and effective, such that the wireless audio transmitter 100b is not prone to be detached in the using process.

The path of the groove is annularly arranged along the side surface of the periphery of the second plug-in connector 70, and the arrangement path of the groove is in a form of closed-loop arrangement or an open-loop arrangement. Preferably, in the present embodiment, the arrangement path of the groove is in an open-loop arrangement. The loop central axis of the groove is parallel to the orientation of the second plug-in hole. In order to achieve a better use effect, the loop central axis of the groove coincides with the central axis of the second plug-in hole. The elastic member 80 is an elastic piece arranged in a form of open-loop arrangement. The ring diameter of the groove is matched with the ring diameter of the elastic member 80. Specifically, when the elastic member 80 is tightly hooped in the groove, the elastic member 80 is in an extended state, so that the elastic member 80 is tightly locked in the groove. Preferably, the elastic member 80 is made of metal.

Please referring to FIG. 7, the cross-sectional shape of the elastic member 80 at least includes a V-shaped opening arranged towards the inner ring. Specifically, the cross-sectional shape of the elastic member 80 can be a V shape or a W shape formed by combining two V shapes or a shape formed by combining more than two V shapes in parallel. Preferably, in the present embodiment, the cross-sectional shape of the elastic member 80 is v-shaped. In order to prevent the annular-shaped elastic member 80 from detaching from the groove during use, the angle value of the central angle corresponding to the elastic member 80 is larger than 270 degrees and smaller than 350 degrees. The angle value of the central angle corresponding to the elastic member 80 can be 270 degrees, 300 degrees, 320 degrees or 350 degrees. In the present embodiment, the angle value of the central angle corresponding to the elastic member 80 is 300 degrees.

The elastic member 80 is provided with a plurality of elongated holes 82 which are arranged in the radial direction and penetrate through the surfaces of the two sides of the elastic member 80. The length direction of the elongated holes 82 is the same as the opening direction of the second plug-in holes, wherein each of the elongated holes 82 is arranged at equal intervals along the annular arrangement direction of the elastic member 80.

Due to the arrangement of the elongated holes 82, when the peak 81 of the elastic member 80 is compressed by the hole wall of the second plug-in hole, the elastic element 80 is able to generate a proper elastic deformation, so that the elastic member 80 elastically abuts against between the bottom of the groove and the hole wall of the second plug-in hole, which enables the second plug-in hole and the second plug-in connector 70 to achieve a better plug-in effect.

The wireless audio transmitter 100b further includes a second housing 60 connected to the second plug-in connector 70, and the second housing 60 is encircled to form a second accommodation cavity (not shown) with an opening configured for containing the signal transmitting component. The second plug-in connector 70 is connected with the opening of the second housing 60.

Please referring to FIG. 6, the wireless audio transmitter 100b further includes a second power button 64 arranged at the second housing 60, a second frequency modulation button 62 and a switch button 63. The second power button 64 is configured for switching on/off the electric connection between the second rechargeable power supply and the signal transmitting component. The second frequency modulation button 62 is configured for switching among the communication channels of the signal transmitting component, wherein the switch button 63 is configured for switching the connection between the wireless audio transmitter 100b and different external audio devices (not shown). When the second frequency modulation button 62 is configured for switching the communication channel of the signal transmitting component, the second frequency modulation button 62 is pressed for each time, and a communication channel of the signal transmitting component can be switched. When the second power button 64 turns off the wireless audio transmitter 100b, the last communication channel which is being used is stored and the wireless audio receiver 100a is in a mute state at the moment. When the second power button 64 turns on the wireless audio transmitter 100b once again, the default communication channel is the communication channel stored when the wireless audio transmitter 100b is turned off, and the signal transmitting component has six communication channels.

Different connection gears of the wireless audio transmitter 100b can be switched by the switch button 63, so that the wireless audio transmitter 100b can be connected with different external audio input devices. Specifically, in this embodiment, the switch button 63 has two gears, that is, a Mic (microphone gear) and a line (line gear). When the switch button 63 is in the Mic gear position, the wireless audio transmitter 100b can be connected with an external wireless microphone. When the external audio input device needs to be connected, since the output volume of the connected audio input device is different in general, when the switch button 63 is switched to the line gear, the wireless audio transmitter 100b has a volume of −12 dB, so that the sound of the connected audio input device will not crack due to the too loud output volume. When the wireless audio transmitter 100b is connected with an external audio input device, the interface type of the connected audio input device needs to match with the second plug-in connector 70.

The second accommodation cavity (not shown) is provided with a second rechargeable power supply configured for supplying power to the signal transmitting component, and the second rechargeable power supply is preferably a lithium battery. The second housing 60 is further provided with a second charging interface 61 configured to be used by the external power supply so as to charge the second rechargeable power supply. The second charging interface 61 is preferably a TYPE-C interface. In other embodiments, according to the arrangement of a wireless rechargeable device, the second rechargeable power supply can be charged wirelessly.

By plugging the wireless audio transmitter 100b into the second plug-in hole corresponding to the wireless microphone, a plug-and-play is achieved, and the wireless audio transmitter 100b is provided therein with the second rechargeable power supply, there is no need to arrange additional power supply devices. The structure is simple, and it is convenient to carry. The wireless audio transmitter 100b has a simple structure and is convenient to be taken along.

The above descriptions are merely preferred embodiments of the present application, and are not intended to limit the present application. Any modification, equivalent replacement, improvement and the like, which are made within the spirit and principle of the present application, should all be included in the protection scope of the present application.

The invention claimed is:

1. A wireless audio transmission system, comprising a wireless audio transmitter matched with an audio input device in a plug-in manner and configured to transmit an audio signal, a wireless audio receiver matched with an audio output device in a plug-in manner and configured to receive the audio signal, wherein the audio output device is provided with a first plug-in hole matched with the wireless audio receiver in a plug-in manner, and the audio input device is provided with a second plug-in hole matched with the wireless audio transmitter in a plug-in manner, wherein the wireless audio receiver includes a signal receiving component configured to receive the audio signal and a first plug-in connector signally connected with the signal receiving component and configured to match with the first plug-in hole in plug-in manner so as to transmit the audio signal received by the signal receiving component to the audio input device, and a first housing connected with the first plug-in connector; wherein the first housing is encircled to form a first accommodation cavity which has an opening and is configured to accommodate the signal receiving component, wherein the first plug-in connector is connected with the opening of the first housing.

2. The wireless audio transmission system as claimed in claim 1, wherein the first plug-in connector further comprises a positioning bump arranged at an end side of the first plug-in connector facing the first housing and configured to position the first plug-in connector to be connected to the first housing, wherein the first housing is provided with a positioning slot matched with the positioning bump in uses.

3. The wireless audio transmission system as claimed in claim 2, wherein the first plug-in connector extends inwardly towards the first accommodation cavity and forms a plurality of connecting arms, wherein an end of the connecting arm is connected with the plug-in connector, and another end of the connecting arm is connected with the housing, wherein the plurality of the connecting arms are uniformly arranged at two sides of the positioning bump.

4. The wireless audio transmission system as claimed in claim 3, wherein each of the connecting arms is provided with a first connecting hole, and a second connecting hole is formed in the first housing and is arranged in a position corresponding to the first connecting hole.

5. The wireless audio transmission system as claimed in claim 1, wherein the signal receiving component comprises an antenna configured to receive the audio signal, and the wireless audio receiver further comprises an antenna cover which is connected with the housing and wraps around the periphery of the antenna.

6. The wireless audio transmission system as claimed in claim 5, wherein the end side of the antenna cover connected with the first housing is provided with a plurality of barbs, and the first housing is provided with a plurality of barb slots matched with the barbs, each of the barbs is snap-fitted into a corresponding barb slot.

7. The wireless audio transmission system as claimed in claim 1, wherein the first accommodation cavity is provided therein with a first rechargeable power supply configured to supply power to the signal receiving component, wherein the first housing is further provided with a first charging interface configured for being used by an external power supply to charge the first rechargeable power supply.

8. The wireless audio transmission system as claimed in claim 7, wherein the wireless audio receiver further comprises a first power button and a first frequency modulation button , both the first power button and the first frequency modulation button are arranged at the first housing; wherein the first power button is configured to switch on/off the electric connection between the first rechargeable power supply and the signal receiving component; and the first frequency modulation button is configured to switch among communication channels of the signal receiving component.

9. The wireless audio transmission system as claimed in claim 1, wherein the wireless audio transmitter includes a signal transmitting component configured to transmit the audio signal outwards and a second plug-in connector matched with the second plug-in hole in a plug-in manner so as to transmit the audio signal of the audio input device to the signal transmitting component, wherein a groove is formed in a side wall of the second plug-in connector, and the orientation of the groove is perpendicular to the orientation of the second plug-in hole; the wireless audio transmitter further comprises an elastic member received in the groove, wherein the elastic member elastically abuts against the bottom of the groove and the hole wall of the second plug-in hole.

10. The wireless audio transmission system as claimed in claim 9, wherein the arrangement path of the groove is along the peripheral side of the second plug-in connector, wherein the arrangement path of the groove is in a form of a closed-loop arrangement or an open-loop arrangement, and the loop central axis of the groove is parallel to the orientation of the second plug-in hole, the elastic member is an elastic piece in an open-loop arrangement , and the loop diameter of the groove is matched with the loop diameter of the elastic member.

11. The wireless audio transmission system as claimed in claim 10, wherein the wireless audio transmitter further comprises a second housing connected with the second plug-in connector, and the second housing is encircled to form a second accommodation cavity which has an opening and is configured to receive the signal transmitting component, wherein the second plug-in connector is connected with the opening of the second housing.

12. The wireless audio transmission system as claimed in claim 11, wherein the second accommodation cavity is provided with a second rechargeable power supply configured to supply power to the signal transmitting component, and the second housing is further provided with a second charging interface configured to be used by an external power supply to charge the second rechargeable power supply.

13. The wireless audio transmission system as claimed in claim 12, wherein the wireless audio transmitter further comprises a second power button, a second frequency modulation button and a switch button, all of which are arranged at the second housing, wherein the second power button is configured to switch on/off the electric connection between the second rechargeable power supply and the signal transmitting component, and the second frequency modulation button is configured to switch among the communication channels of the signal transmitting component, and the switch button is configured to switch the connection between the wireless audio transmitter and different external audio devices.

14. The wireless audio transmission system as claimed in claim 9, wherein the cross-sectional shape of the elastic member comprises at least a V-shaped opening arranged to extend inwardly towards the loop, wherein the angle value of the central angle corresponding to the elastic member is larger than 270 degrees and smaller than 350 degrees.

15. The wireless audio transmission system as claimed in claim 9, wherein the elastic member is provided with a plurality of elongated holes arranged in the radial direction and arranged in a penetrating manner, wherein the length direction of each of the elongated holes is the orientation of the second plug-in hole, and each of the elongated holes is arranged at intervals along a peripheral direction of the elastic member.

16. The wireless audio transmission system as claimed in claim 15, wherein the elongated holes are arranged at equal intervals.

* * * * *

UNITED STATES PATENT AND TRADEMARK OFFICE
CERTIFICATE OF CORRECTION

PATENT NO. : 10,693,514 B1  
APPLICATION NO. : 16/071552  
DATED : June 23, 2020  
INVENTOR(S) : Wei Li Page 1 of 1

It is certified that error appears in the above-identified patent and that said Letters Patent is hereby corrected as shown below:

In the Claims

Column 8, Line 66, In Claim 1, should read:
"receiving component to the audio output device, and a first housing connected with the first plug-in"

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*